April 9, 1968   J. J. IHNACIK, JR   3,376,704

DUAL MASTER CYLINDER FOR BRAKE SYSTEM

Filed Dec. 20, 1965   2 Sheets-Sheet 1

JOSEPH J. IHNACIK, JR.
*INVENTOR*

BY John R. Faulkner
Clifford L. Sadler

*ATTORNEYS*

JOSEPH J. IHNACIK, JR.
INVENTOR

United States Patent Office 3,376,704
Patented Apr. 9, 1968

3,376,704
DUAL MASTER CYLINDER FOR BRAKE SYSTEM
Joseph J. Ihnacik, Jr., Detroit, Mich., assignor to The Ford Motor Company, Dearborn, Mich., a corporation of Delaware
Filed Dec. 20, 1965, Ser. No. 514,866
8 Claims. (Cl. 60—54.6)

ABSTRACT OF THE DISCLOSURE

A dual master cylinder for a brake system having a floating balancing piston that is constructed to become seated in the main piston upon hydraulic failure in one portion of the brake system or to engage the end of the cylinder bore upon a failure in another portion of the brake system.

---

The present invention relates generally to master cylinders for brake systems, and more particularly to a dual master cylinder for a split system.

It has been recognized in recent years that there are certain advantages to providing a motor vehicle with separate hydraulic brake systems for the front and rear wheels that are independent of one another. These systems are actuated by a single master cylinder having two mutually independent pressure chambers; one for feeding the front wheel brakes and the other for feeding the rear wheel brakes. Unlike vehicles having a single hydraulic brake system, in the event of a failure in either the front or rear half of a dual system the other half is still available for stopping the vehicle.

In a conventional dual master cylinder for a split hydraulic system, a balancing piston is usually provided between the two pressure chambers to equalize the pressures. The balancing piston moves from a neutral position to an extreme position when a failure occurs that makes it impossible to develop pressure in one of the halves of the system. The balancing piston is returned to its neutral position when pressure is relieved. As long as a failure exists in such a system, fluid is expended in displacing the balancing piston upon each stroke of the master cylinder piston. The fluid used to displace the balancing piston is in addition to the fluid needed to actuate that portion of the brake system that is still in tact.

In view of the state of the art, it is an object of the present invention to provide a dual master cylinder for a split brake system having an improved balancing piston between two pressure chambers.

More particularly, it is an object to provide an improvement wherein movement of the balancing piston is controlled so that in the event of failure in one portion of the system, the balancing piston will move from a neutral position and become seated and secured in a new location and further movement of the balancing piston will not be required upon subsequent brake applications. The piston remains in the new location until the failure has been corrected.

It is another object of this invention to provide a balancing piston mechanism for a dual master cylinder in which failure in another portion of the braking system will cause the balancing piston move to an extreme position, but the fluid displacement lost by the initial movement of the balancing piston will be recovered at the end of the stroke of the main piston.

The many objects and advantages of the present invention will become apparent upon consideration of the following discussion and the accompanying drawings, in which.

Figure 1:
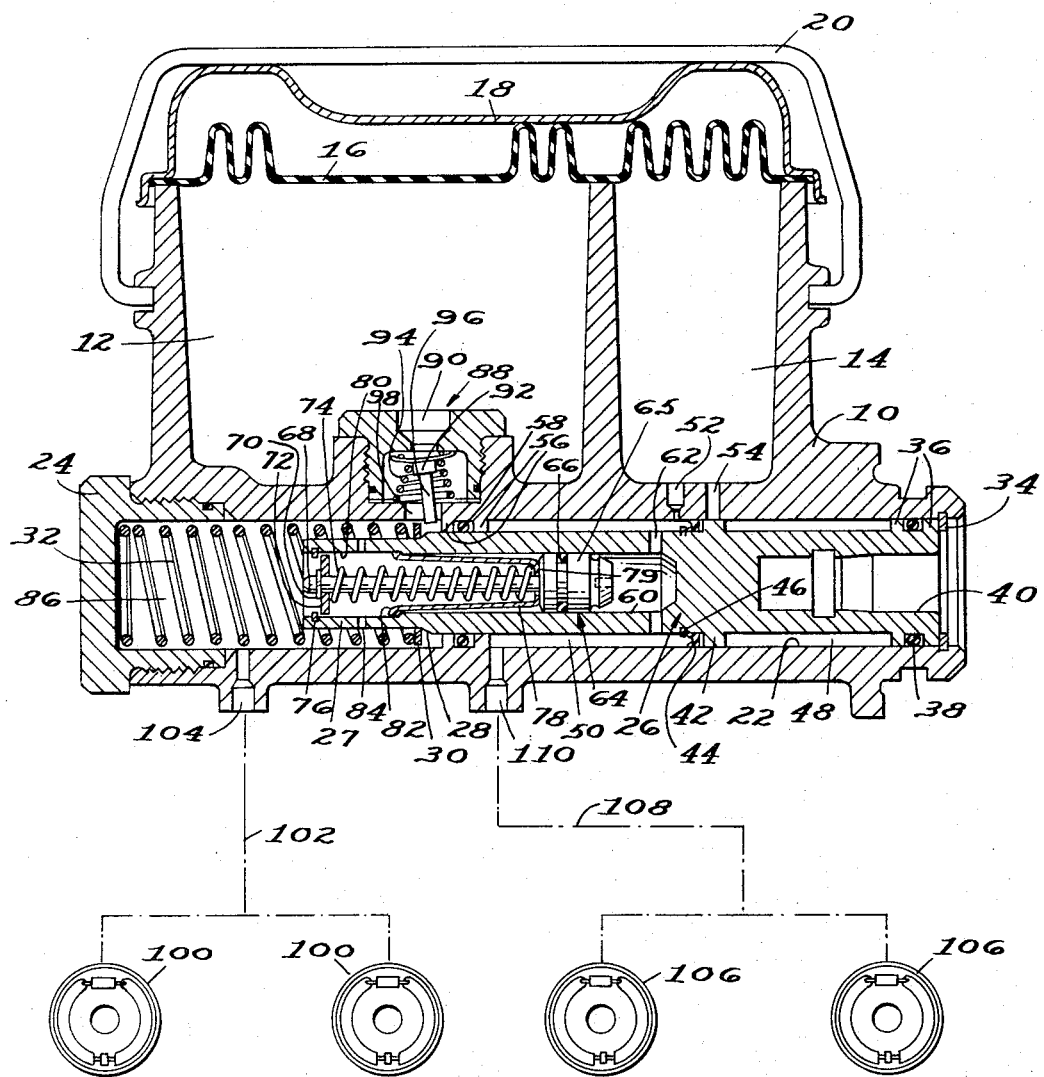
FIGURE 1 is an elevational view in section of a dual master cylinder for a split brake system that incorporates a preferred embodiment of this invention.

Referring now to the drawings for a more complete understanding of the present invention, FIGURE 1 discloses a dual master cylinder for a split hydraulic brake system. The dual master cylinder of FIGURE 1 comprises a housing 10 having an upper portion that is divided into front and rear reservoir chambers 12 and 14. The open upper end of the reservoir chambers 12 and 14 are sealed by a flexible rubber diaphragm 16 that has a plurality of corrugations to enhance its flexibility. A cover or lid 18 is positioned over the diaphragm 16 and is sealed along the edges of the reservoirs 12 and 14 by a bale 20 which holds the perimeter of the cover 18 against the upper end of the master cylinder housing 10.

The housing 10 has an axially extending bore 22 that is opened at the right-hand end as seen in FIGURE 1 and closed at the left-hand end by a screw cap 24. A piston 26 is slidably disposed within the bore 22. The left or inner end of the piston 26 has a reduced outside diameter portion 27 that terminates at a shoulder 28. A spring retainer 30 encircles the ends of the piston 26 and is seated against the shoulder 28. The retainer 30 is pressed by a coil spring 32 which has one end that bears against the cap 24 and the other end which bears against the spring retainer 30.

The spring 32 urges the piston 26 in a right-hand direction against a snap ring 34. The snap ring functions as a retainer to keep the piston 26 within the bore 22.

A pair of radial flanges or lands 36 at the righthand or outer end of the piston 26 defines a groove for a hydraulic seal 38. A blind bore 40 is formed in the end of the piston 26 to receive a push rod of the master cylinder actuating mechanism. The push rod is connected to the brake pedal at one end and is inserted in the bore 40 at its other end.

A land 42 is spaced inwardly from the seal 38 and is in sliding contact with the bore 22. Rubber seal 44 is held against the land 42 by a snap ring 46. The outside diameter of the piston 26 is smaller than the bore 22 so that annular chambers 48 and 50 are defined on either side of the land 42.

A compensating port 52 is drilled in the lower end of the reservoir 14 and provides communication between the reservoir chamber 14 and the annular space 50. As will appear later, the annular space 50 constitutes a pressure chamber for delivering hydraulic fluid to the rear brakes of a split hydraulic brake system. A second port 54 is spaced to the right of the compensating port 52 and is in communication with the chamber 48 behind the seal 44 when the piston 26 is moved to the left during brake application. This prevents creation of a vacuum in the chamber 48 as well as providing a means for returning brake fluid to the reservoir 14 that escapes past the seal 44.

A pair of spaced lands 56 extend inwardly from the wall of bore 22 and provides a means for retaining an O-ring seal 58. The seal 58 is in sliding seal contact with the exterior surface of the piston 26 and defines the left-hand end of the chamber 50.

An axially extending bore 60 is provided in the left end of piston 26. The bore 60 is open at the left and terminates to the left of the seal 44. Radial ports 62 in the piston 26 provide communication between the pressure chamber 50 and the bore 60. A balancing piston assembly 64 is slidably positioned within the bore 60 and is in sealed contact therewith by means of an O-ring seal 66.

A stem member 68 extends from the left end of the body portion 65 of the balacing piston assembly 64. The left end of the stem 68 terminates in the region of the left end of the piston 26. A snap ring 70 is connected to the left end of a stem 68 and retains a washer 72 which, in turn, retains a coil spring 74. A second snap ring 76 contains the retainer 72 within the bore 60.

An elongated sheet metal spring retainer 78 has a body portion that extends axially within the bore 60 and a turned-in portion 79 adjacent to the intersection between the stem 68 and piston body 65. The spring 74 presses against the turned-in end 79 of the sheet metal member 78. The open end of the bore 68 is drilled out to have an enlarged internal diameter portion 80. The end 82 of the sheet metal member 78 is flared outwardly to ride in the enlarged portion 80. The shoulder formed between the regular diameter portion of the bore 60 and the enlarged diameter portion 80 provides a stop for the flared end 82.

Radial ports 84 in the piston 26 provide communication between the pressure chamber 86 and the depth of the bore 22 and that portion of the piston bore 60 that is situated to the left of the piston 65. Due to the presence of the ports 84 and the ports 62, the piston body 65 is exposed to the pressure in chamber 50 on one of its sides and the pressure in chamber 86 on the other of its sides.

Fluid enters pressure chamber 86 from reservoir 12 by means of a tilting valve assembly 88. The tilting valve assembly 88 includes a compensating port 90 that is sealed by a valve element 92 having a T-shaped cross section. A spring 94 urges the valve element 92 into sealed engagement across the lower end of the port 90. A stem portion 96 protrudes downwardly from the valve element and through a port 98 in the wall of the bore 22. The port 98 is situated just to the left of the seal 58. The stem 96 extends into the pressure chamber 86 and is engageable by the washer retainer 30 when the piston 26 is in the right-hand retracted position as seen in FIGURE 1. In this position, the retainer 30 tilts the valve element 92 to open the port 90 and permit the flow of brake fluid from the reservoir 12 into the chamber 86. When the piston 26 moves to the left during brake application, the valve element 92 returns to seal the port 90.

As explained previously, the dual master cylinder of FIGURE 1 is intended for use in a split hydraulic system. In such a system, a pair of front brake assemblies 100 are connected by a hydraulic line 102 to a port 104 that is in communication with the pressure chamber 86. Similarly, rear hydraulic brakes 106 are connected by hydraulic line 108 to a port 110 that is in communication with the pressure chamber 50.

OPERATION

During normal brake application the piston 26 is moved to the left by the push rod. Fluid situated in chamber 86 to the left of the seal 58 is expelled through the port 104 to the front brakes 100 in an amount equal to that displaced by the piston. Fluid in the chamber 50 is expelled through the port 100 to the rear brakes 106 as the seal 44 moves toward the seal 58. The piston 65 balances the pressure between the chambers 50 and 86.

Figure 4:
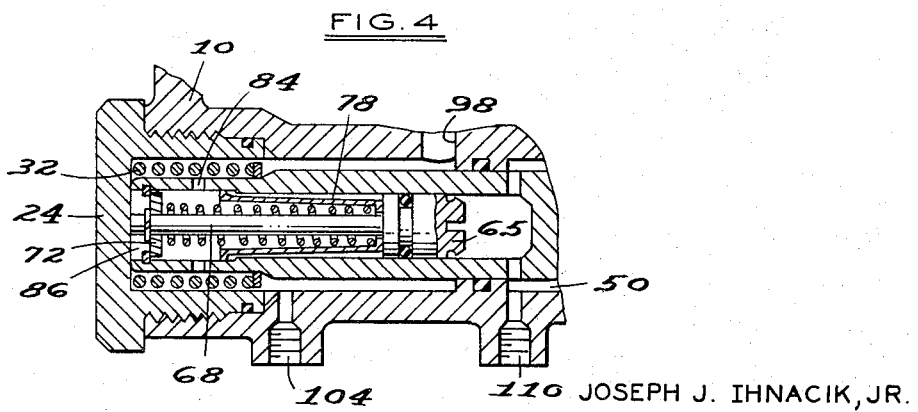
FIGURE 4 is a sectional view corresponding to FIGURE 3 showing the main master cylinder piston at the end of a stroke.

In the event of a failure in the front system, such as in the hydraulic line 102 or at the brakes 100, pressure cannot be developed in the chamber 86. Thus, as the piston 26 moves to the left there will be a pressure buildup in chamber 50 and also in that portion of the bore 60 situated to the right of the balancing piston 65. An offsetting pressure will not occur to the left of the piston 65 and thus, the piston 65 will move to the left with respect to the piston 26. This movement will be against the force of the coil spring 74 and will cause a protrusion of the piston stem 68 from the end of the main piston 26 as illustrated in FIGURE 4. When the piston 26 approaches the end of its stroke, the stem 68 will come in contact with the cap 24. Further inward movement of the main piston 26 will cause the balancing piston 65 to move to the right back into the bore 60 so that the previously expanded chamber between the depth of the bore 60 and the piston 65 will be reduced in size and fluid will be forced back into the pressure chamber 50 and out the line 108 to the brakes 106. Thus, upon initial brake application when pressure cannot be created in chamber 86, the piston 65 moves to the left causing an apparent loss in fluid displacement, however, this loss is recovered at the end of the stroke of the main piston 26 as the balancing piston 65 is forced back toward the depth of the bore 60.

The end result is that the total amount of fluid displaceable to the rear brakes by leftward movement of the piston 26 is not changed although the rate at which the fluid is expelled from the port 110 will be changed.

For illustrative purposes assume that the failure is in the rear brake system. Under these conditions, pressure cannot be maintained in chamber 50 and the portion of bore 60 to the right of balancing piston 65. Under these conditions, an initial pressure buildup in chamber 86 will cause the balancing piston 65 to move deeper into the bore 60 because there is no counterbalancing pressure behind it. This movement will continue until the piston 65 engages the depth of the bore 60. Further apparent expansion of the pressure chamber 86 by displacement of piston 65 will not be possible. Continued movement of the piston 26 to the left produces a pressure buildup in chamber 86 and a forcing of fluid to the brakes 100.

Figure 2:
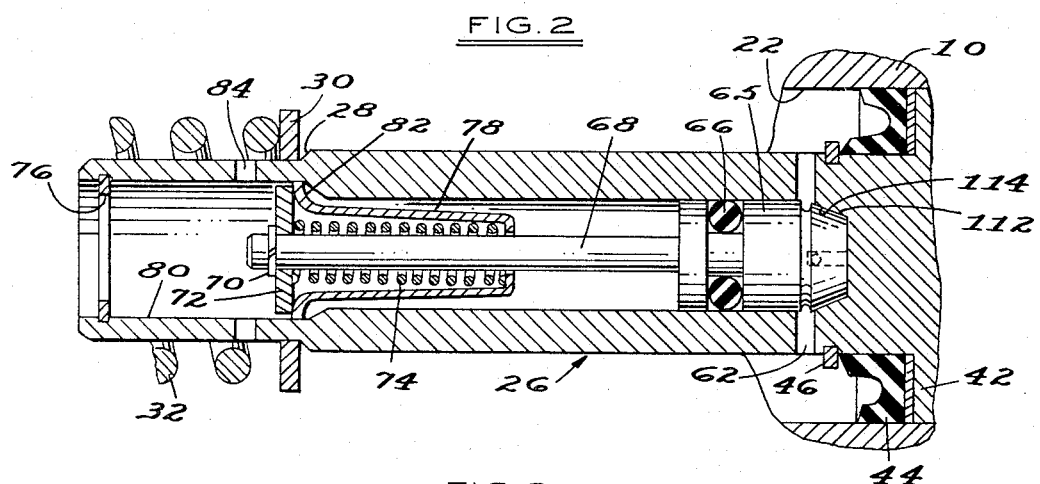
FIGURE 2 is an enlarged sectional view of a portion of the master cylinder of FIGURE 1 showing the balancing piston stationary in an extreme position.
Figure 3:
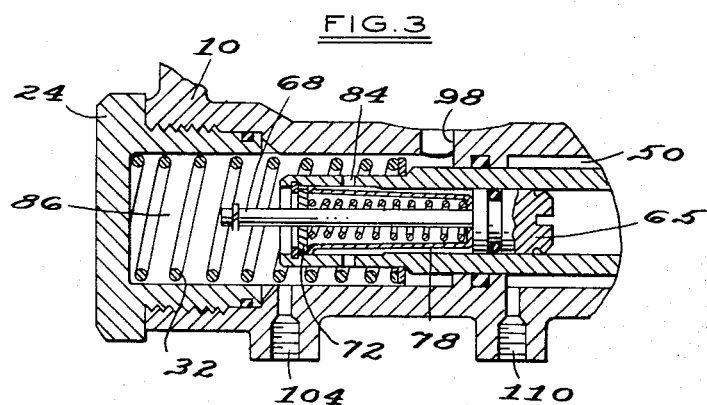
FIGURE 3 is an enlarged sectional view of the balancing piston portion of FIGURE 1 showing the balancing piston in a position it would assume upon failure in a portion of the hydraulic system.

Referring to FIGURE 2, it will be noted that the right-hand end of the balancing piston 65 is provided with a bevelled surface 112. The depth of the bore 60 is provided with a corresponding bevel 114. The angle of the bevelled surfaces 112 and 114 is selected so that when the piston 65 is jammed to the depth of the bore 60 by pressure in chamber 86, it will be wedged in place with a self-locking action. The jamming effect of the bevelled end 112 into the bevelled depth of the bore 60 is sufficient to resist the force exerted by spring 74. Thus, on initial brake application, a portion of the fluid is apparently lost due to expansion of chamber 86 when the piston 65 moves to the right. However, the piston 65 will henceforth stay in the right-hand position and the volume previously displaced by it will be replenished through the tilting valve 88 when the piston 26 is returned to its neutral or right-hand position. On subsequent brake applications, fluid is not needed to displace the balancing piston 65 because it is stationary in a new location and the front brakes will function in a normal fashion.

The piston 65 will be released from its jammed position, after the failure in the rear brake system has been corrected, upon regular brake application. Once the leak in the rear brake has been sealed, a pressure buildup in chamber 50 will act against the piston 65 forcing it with the aid of spring 76 back to its normal position of FIGURE 1.

Thus, this invention provides a dual master cylinder for a split system having a balancing piston to regulate pressure between the front and rear brakes and which is movable upon the failure of either half of the system. Unlike other systems, however, the loss in displacement normally occurring upon movement of the balancing piston is recovered at the depth of the stroke of the main piston for a front brake mailure or upon subsequent strokes of the main piston upon a rear brake failure. Under these circumstances, the brakes function and respond to the driver in a more customary fashion. There is no increase in pedal movement which is normally experienced with the dual master cylinder upon failure of half of the system.

The foregoing description presents the presently preferred embodiment of this invention. Modifications and alterations may occur to those skilled in the art that will come within the scope and spirit of the following claims.

I claim:

1. A master cylinder having a first pressure chamber and a second pressure chamber, an axial bore and a balancing piston slidably disposed within said bore, means providing communication between said first pressure chamber and a first portion of said bore on one side of said balancing piston, means providing communication between said second pressure chamber and a second portion of said bore on the other side of said piston, said balancing piston being slidable within said bore in response to a pressure differential between said pressure chambers, said balancing piston being movable to an extreme position in said bore upon an increase in pressure in said second chamber and an absence of pressure in said first chamber, spring means urging said piston to a set position within said bore, self-locking means constructed to retain said balancing piston in said extreme position against the force of said spring means.

2. A master cylinder according to claim 1 and including:
a main bore, a main piston slidable within said bore, said main piston and said main bore defining portions of said first and second pressure chambers, said axial bore being situated within said main piston.

3. A dual master cylinder for a split hydraulic system having means defining a closed end first bore, a main piston slidable within said first bore and movable toward the closed end of said first bore, a first pressure chamber and a second pressure chamber, a second bore disposed within said main piston, a balancing piston slidably disposed within said second bore, first means providing communication between said first pressure chamber and a first portion of said second bore on one side of said balancing piston, second means providing communication between said second pressure chamber and a second portion of said second bore on the other side of said piston, said balancing piston being movable within said main piston toward said closed end of said first bore upon creation of pressure in said first pressure chamber and in the absence of pressure in said second pressure chamber, third means engageable with the means defining said first bore and constructed to force said balancing piston into said second bore when said main piston moves toward said closed end of said first bore.

4. A dual master cylinder according to claim 3 and including:
said first pressure chamber being defined between said piston and said first bore and intermediate the ends of said piston, said second pressure chamber being situated in part between the end of said first bore and the end of said main piston, spring means urging said balancing piston to a set position, said third means comprising stem means protruding from said balancing piston in the direction of the closed end of said first bore, said stem means being engageable with said closed end of said first bore, self-locking means constructed to retain said balancing piston at the depth of said second bore, said balancing piston being movable to the depth of said second chamber and an absence of pressure in said first chamber.

5. A dual master cylinder according to claim 3 and including:
said first pressure chamber being defined between said piston and said first bore and intermediate the ends of said piston, said second pressure chamber being situated in part between the end of said first bore and the end of said main piston, spring means urging said balancing piston to a set position, said third means comprising stem means protruding from said balancing piston in the direction of the closed end of said first bore, stem means being engageable with said closed end of said first bore.

6. A dual master cylinder according to claim 3 and including:
said third means comprising stem means protruding from said balancing piston in the direction of the closed end of said first bore, said stem means being engageable with said closed end of said first bore, self-locking means constructed to retain said balancing piston at the depth of said second bore, said balancing piston being movable to the depth of said second bore upon an increase in pressure in said second chamber and an absence of pressure in said first chamber.

7. A dual master cylinder according to claim 3 and including:
said third means comprising stem means protruding from said balancing piston in the direction of the closed end of said first bore, said stem means being engageable with said closed end of said first bore.

8. A dual master cylinder according to claim 3 and including:
said balancing piston being movable to the depth of said second bore upon an increase in pressure in said second chamber and an absence of pressure in said first chamber, self-locking means constructed to retain said balancing piston at the depth of said second bore.

References Cited

UNITED STATES PATENTS

| 2,074,416 | 3/1937 | Oliver | 60—54.5 |
| 2,253,240 | 8/1941 | Loweke | 60—54.5 |

MARTIN P. SCHWADRON, *Primary Examiner.*

ROBERT R. BUNEVICH, *Examiner.*